Dec. 25, 1962                W. H. EDMUNDS                3,070,728
        SELECTIVE TRIP ARRANGEMENT UTILIZING CIRCUIT BREAKERS
           WHICH ARE COORDINATED WITH CURRENT LIMITING FUSES
Filed Aug. 16, 1957                                   2 Sheets-Sheet 1
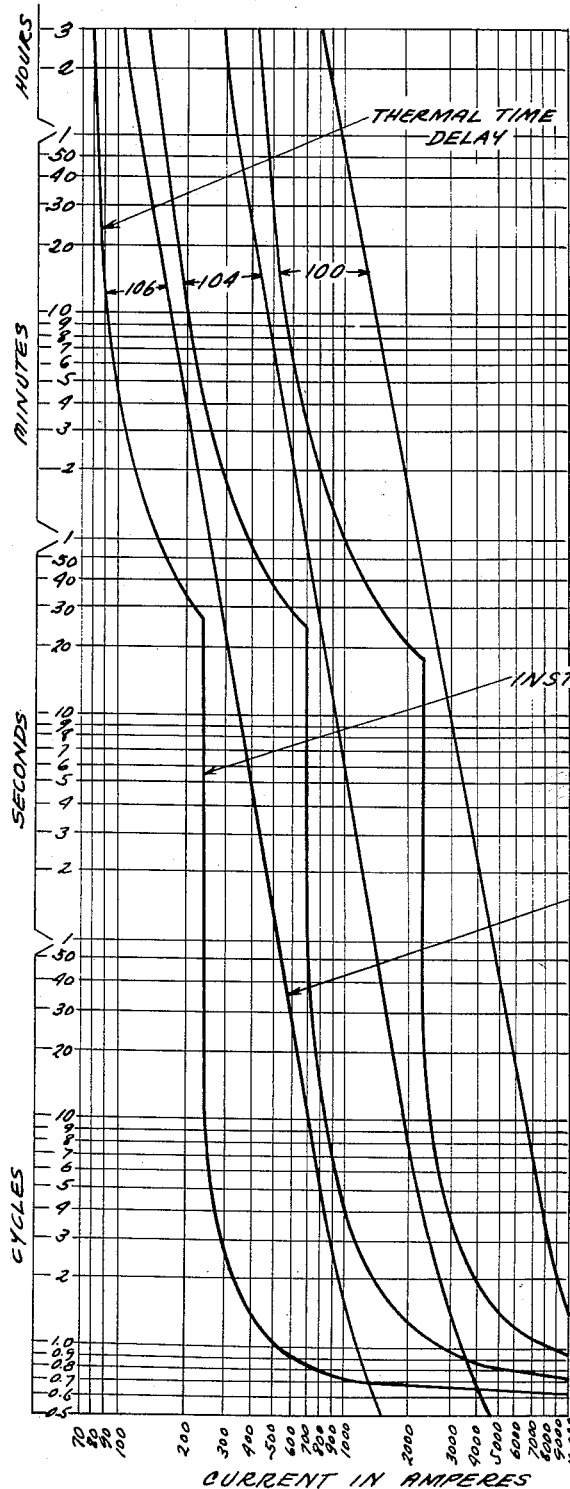
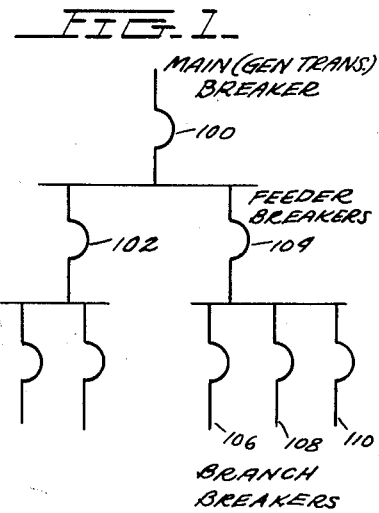
INVENTOR.
WILLIAM HAROLD EDMUNDS
BY
       ATTORNEYS

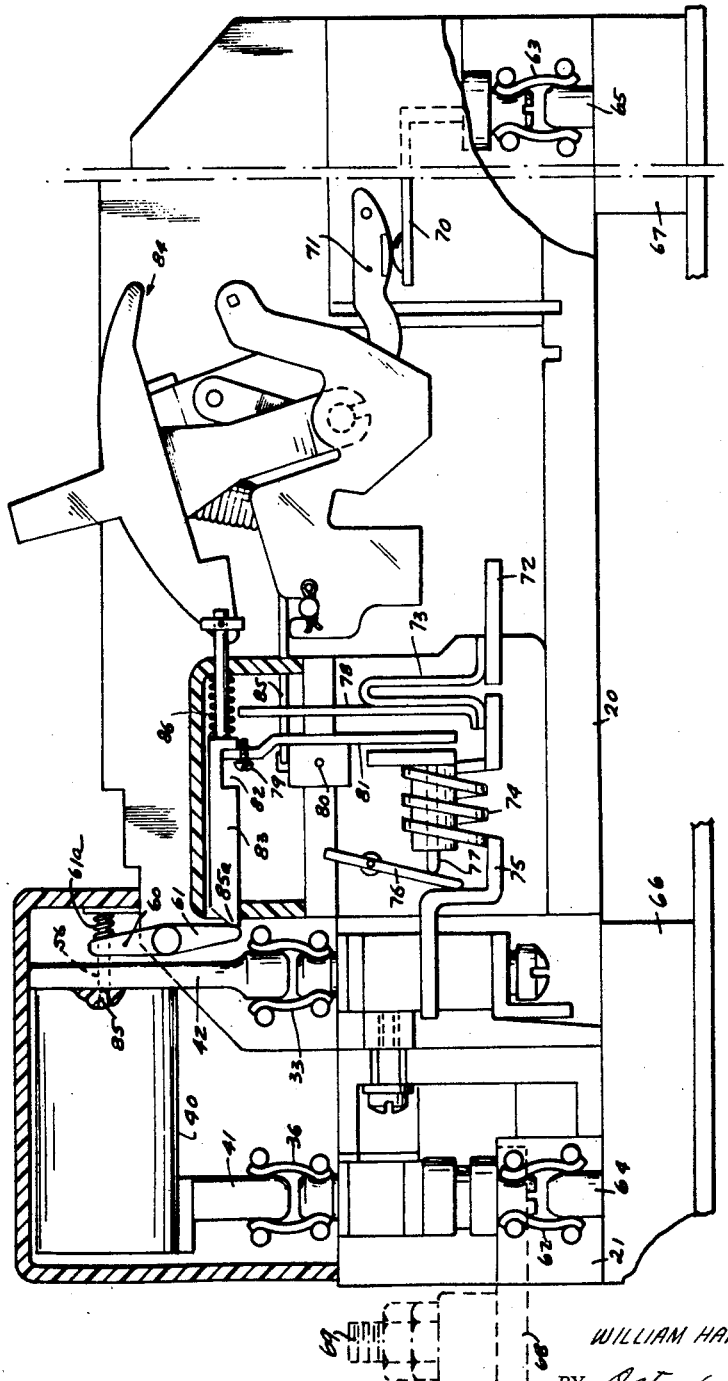

United States Patent Office 3,070,728
Patented Dec. 25, 1962

3,070,728
SELECTIVE TRIP ARRANGEMENT UTILIZING CIRCUIT BREAKERS WHICH ARE COORDINATED WITH CURRENT LIMITING FUSES
William Harold Edmunds, Havertown, Pa., assignor to I-T-E Circuit Breaker Company, Philadelphia, Pa., a corporation of Pennsylvania
Filed Aug. 16, 1957, Ser. No. 678,649
6 Claims. (Cl. 317—26)

My invention relates to a selective trip arrangement and is more specifically related to the use of circuit breakers which are coordinated with current limiting fuses in a selective trip arrangement wherein the cross-over point between the current limiting fuse and one of the trip elements of the circuit breaker is below the interrupting capacity of the circuit breaker.

Selective trip arrangements such as the arrangement set forth in United States Patent No. 2,704,311 to Thumim and assigned to the assignee of the instant invention operate so that a plurality of circuit breakers may be connected in series wherein each of the circuit breakers is capable of interrupting any fault in its locality so that service is interrupted only in that part of the system where the fault occurs while leaving the remainder of the system in service.

Until the present time, it has not been possible to utilize circuit breakers which are coordinated with current limiting fuses as the circuit interrupting device in a selective trip arrangement because the operation of the trip elements of an interrupting device closer to the source may closely coincide with the operation of the trip elements of the circuit breakers closer to the load responsive to a fault on the circuit closer to the load since the cross-over point at which the current limiting device of the latter unit is at a point which is above the interrupting rating or ability of its respective unit. This may be understood with reference to my U.S. Patent No. 2,843,702 issued July 15, 1958 entitled Protective Device With Current Limiting Means and my copending applications Serial No. 461,378 filed October 11, 1954 entitled Circuit Breaker Having Electrical and Mechanical Coordination With a Current Limiting Device, now Patent No. 3,032,631, and Serial No. 622,042 filed November 14, 1956 entitled End Mounting of a Current Limiting Device Associated With a Circuit Breaker, now Patent No. 2,924,688 respectively, each of which are assigned to the assignee of the instant invention.

As set forth therein, circuit breakers which are coordinated with current limiting fuses comprise a standard circuit breaker which could have either a thermal trip element or both a thermal and a magnetic trip element which operate to trip the breaker on overload or relatively low fault conditions respectively. A current limiting fuse is then connected in series with each phase of the normal circuit breaker device wherein the current limiting fuse operates responsive to relatively severe short circuit conditions. The point at which the current limiting fuse takes over operation from the thermal trip element, or the magnetic trip element when it is provided, is known as the "cross-over point" of the interrupter. It is to be noted that this cross-over point is usually beyond the capacity or interrupting ability of the circuit breaker.

However, the current limiting fuse operates when the rate of rise of current indicates that a subsequent severe fault current will flow. Thus the current limiting fuse begins to limit the current as set forth in the above noted applications wherein the let-through current is substantially lower than the available short circuit current of the system.

Because of this operation, the total size of any circuit interrupter, in view of the limitation of thermal and magnetic stress, may be appreciably smaller than would a corresponding circuit breaker which has to withstand the available short circuit current of a particular system. Therefore, if a circuit interrupting device of the type utilizing current limiting fuses could be applied to a selective trip arrangement for a plurality of series connected circuit breakers, the current flow during a severe short circuit condition in any part of the system is limited to the let-through current of the associated circuit interrupter. Hence thermal and magnetic stresses in all of the circuits between the faulted circuit and the source will be decreased in view of the low let-through current as compared to the available short circuit current which normally would flow.

The principle of my novel invention is to decrease the cross-over point of a circuit interrupting device utilizing current limiting fuses to a point which is below the interrupting rating of the circuit breaker whereby the current limiting fuse operates before the trip elements of the circuit interrupter next closer to the sources. It is to be pointed out that this construction is diametrically opposite to the presently used circuit breakers utilizing current limiting devices where the cross-over point is appreciably higher than the interrupting rating of the circuit breaker, the current limiting elements being operated when the rate of change of current during a fault indicates that a severe fault current will be attained.

In the instant invention, however, I have found that by reducing the cross-over point as above stated, I can now utilize current interrupting devices having current limiting means associated therewith in a trip arrangement wherein thermal and magnetic stresses throughout the system are appreciably reduced.

While the circuit breakers which cooperate with current limiting devices in the selective trip arrangement of my invention can be provided with both thermal and magnetic trip elements (or overload and instantaneous trip elements respectively of any desired type) it is to be noted that the magnetic or instantaneous trip elements may be omitted with the thermal trip element operating for all conditions between rated load and the cross-over point.

In this case, and with the low cross-over point, a more active bi-metal may be utilized which would be less sensitive to ambient conditions and also give better calibration characteristics. This is true since the bi-metal will not now have to withstand high short circuit currents. By way of example, if a bi-metal only has to withstand two thousand or three thousand amperes in short circuit current, after which the duty of the breaker is taken over by a current limiting fuse, then the bi-metal can have a reduced cross section to thereby make it more active than it would be if it had to withstand ten thousand or fifteen thousand amperes in short circuit current.

Accordingly, a primary object of my invention is to provide a novel selective trip system.

Another object of my invention is to provide a selective trip system utilizing circuit breakers which are coordinated with current limiting devices.

A further object of my invention is to provide circuit breakers utilizing current limiting fuses in a selective trip system wherein the cross-over point of the circuit interrupting devices is substantially reduced from that which is normally used.

Still another object of my invention is to provide a circuit breaker utilizing current limiting devices in a selective trip system wherein the cross-over point of the circuit interrupting devices are reduced to prevent interference between adjacent series connected circuit interrupting devices and the selective trip system.

A still further object of my invention is to reduce the cross-over point of a combined circuit breaker and current interrupting device to below the interrupting rating of the circuit breaker and to utilize the adapted circuit interrupting device in a selective trip system.

These and other objects of my invention will become apparent from the following description taken in connection with the drawings in which:

FIGURE 1 shows a schematic diagram of an electrical network which may utilize combined circuit breakers and current interrupting devices in accordance with my invention.

FIGURE 2 shows the tripping characteristics of the current interrupting devices of FIGURE 1 on a current-time scale.

FIGURE 3 shows a cross-sectional view through one phase of a typical molded case circuit breaker which is coordinated with a current limiting device.

FIGURE 1 shows a typical three-stage system which consists of a main circuit breaker 100 which could be a generator breaker or a transformer breaker, feeder circuit breakers 102 and 104 and the branch circuit breakers such as circuit breakers 106, 108 and 110. Each of the circuit breakers 106, 108 and 110 may be of the type set forth in FIGURE 3 while the main breaker 100 and feeder breakers 102 and 104 could be either of this type or of the normal or standard circuit breaker type. Clearly, any type of combined circuit breaker and current limiting device could be used in FIGURE 1 so long as they are constructed according to my invention.

FIGURE 2 shows the characteristics of the main breaker, feeder breakers and branch breakers when each are of the type which are coordinated with current limiting devices and adjusted in accordance with my novel invention whereby their cross-over points are substantially reduced so that the current limiting breakers closer to the load, such as breaker 106, prevents interference between the thermal or instantaneous tripping of adjacent breakers (such as feeder braker 104).

In a similar manner, the current limiting device tripping means of breaker 104 is so reduced as to prevent interference with the thermal or instantaneous tripping of the main breaker 100 by the feeder breaker 104.

In operation, FIGURE 2 shows that if a fault appears on a branch containing circuit interrupter 106 of the order of two hundred amperes, the circuit breaker will trip in approximately thirty-five seconds. If this fault is increased to six-hundred amperes, then the tripping will occur in 0.9 cycle. Thus during overloads of a relatively low value, the thermal time delay of the circuit breaker of circuit interrupter 106 will cause the circuit to be opened. If, on the other hand, a relatively low fault current flows in the branch containing breaker 106, then the instantaneous or magnetic portion of the trip unit will cause the breaker to be opened. If, however, the fault current through the breaker is of a relatively high magnitude such as approximately fourteen hundred amperes (which is above the reduced cross-over point of the circuit breaker) then the current limiting fuse will be brought into operation to operate circuit breaker 106 within approximately 0.5 cycle.

In a similar manner, circuit breakers 104 and 100 will operate in the event of a fault in their respective circuits wherein the overload trip element will operate on relatively small overloads, the instantaneous trip element will operate on relatively low fault currents, while the current limiter device will operate on potentially high short circuit currents.

It is to be noted that if the current interrupting device 106 were constructed in the usual manner, that the cross-over point would be considerably further to the right in the embodiment of FIGURE 2 and beyond the interrupting rating of the breaker. This, however, would mean that at current values such as at three thousand amperes, both the instantaneous trip elements of circuit breakers 106 and 104 would be substantially equally affected whereby both of the breakers would be operated. Hence, because of a fault condition in the branch including circuit breaker 106, the operation of feeder breaker 104 would unnecessarily take the branches including breakers 108 and 110 out of service along with the branch including breaker 106.

In accordance with my novel invention, however, I have moved the cross-over point to such a value that there is no intersection between the current limiting device characteristic and the thermal time delay and instantaneous characteristics of adjacent breakers, and I assure that a fault in a branch circuit wlil not cause operation of a breaker in a feeder circuit since the current limiting device in the branch circuit is operated. Such a selective trip arrangement will provide lower magnetic and thermal stresses due to the current limiting effect of the current limiting device not only in the branch including the fault but also in all the series connected devices and conductors in the system.

Thus, where the feeder breakers 102 and 104 and the main breaker 100 are of the type utilizing mechanical timers which allow removal of the faulted breakers without affecting breakers closer to the source, the reduced let-through current of the operating circuit breaker will not subject the circuit breakers to as severe a condition of thermal and magnetic stress as would the available short circuit current of the faulted circuit.

If desired, the branch circuit breakers 106, 108 and 110 need not have both the thermal time delay and instantaneous trip units as indicated in FIGURE 2, but could operate with only the thermal time delay units. Furthermore, since the cross-over point of the current limiting fuse is now lower, the bi-metal may be made more active since it will now withstand a lower short circuit current. Thus the cross-sectional area of the bi-metal may be made smaller so that it will be less sensitive to ambient conditions and will also give better calibration characteristics.

FIGURE 3 shows for illustrative purposes only a cross-sectional view of one phase of one type of circuit interrupting device comprising a combined circuit breaker and current limiting device (fuse 40) which could be utilized as the interrupters of FIGURES 1 and 2. For further details of this structure, reference is made to my copending application Serial No. 622,042 filed November 14, 1956.

As seen in FIGURE 3, a tulip-clip type contact 62 is electrically connected to contact 36 and is fastened within housing 21 in any desired manner. Clearly, a set of disconnects similar to disconnect 62 will be provided for the disconnects of each phase.

The circuit breaker 20 is provided with a similar set of disconnects such as disconnect contact 63, wherein disconnects 62 and 63 cooperate for plug-in engagement with studs 64 and 65 respectively of mounting blocks 66 and 67 which may be fastened within a switchboard. In a similar manner, each of the other phases will be provided with similar sets of disconnects for cooperating with corresponding mounting blocks.

As an alternative FIGURE 3 shows that a straight terminal 68 could be brought out as seen in dotted lines, where connection to the current interrupting device is made at lead connecting means 69.

The current path of the phase shown in FIGURE 3 includes stud 65, circuit breaker tulip clip 63, a stationary contact 70, movable contact of contact arm 71, a pigtail (not shown) which connects contact arm 71 to conductor 72, heater 73, coil 74, conductor 75, tulip clip 33, stud 42, fuse 40, stud 41, tulip clip 36, tulip clip 62, and stud 64.

Coil 74 has a pivotally mounted armature 76 and a plunger 77 associated therewith, these components comprising the magnetic trip unit. Heater 73 has bi-metal 78 and adjusting screw 79 associated therewith, these components comprising the thermal trip unit.

A tripper bar 80 is then seen in FIGURE 3 as having member 81 fastened thereto which carries adjusting screw 79 in cooperating alignment with bimetal 78 and is itself aligned with plunger 77.

Member 81 has one end thereof protruding into slot 82 of trip rod 83 and is rotatable in a counterclockwise direction within slot 82.

The operating mechanism 84 has a latch member 85 connected thereto and constructed to be latched by tripper bar 80. When tripper bar 80 is rotated in a counterclockwise direction, however, latch member 85 will be unlatched to allow mechanism 84 to disengage the circuit breaker cooperating contacts of each phase since mechanism 84 is constructed to be common to each phase.

In the event of a prolonged overload, heater 73 will cause bimetal 78 to deflect into engagement with screw 79 to cause counterclockwise rotation of tripper bar 80 and tripping of the circuit breaker contacts.

Under relatively low fault conditions, coil 74 will create a strong magnetic field to cause armature 76 to drive plunger 77 into engagement with member 81, thus rotating tripper bar 80 counterclockwise to effect instantaneous tripping of the circuit breaker contacts.

FIGURE 3 further shows the striker pin 85 of fuse 40 (as set forth in the above noted copending application Serial No. 622,042) as being positioned in registry with aperture 56 in disconnect 42 and extension 60 of an auxiliary tripper bar.

When fuse 40 is operated (on faults above a predetermined value), striker pin 85 is ejected into engagement with extension 60 to rotate the tripper bar against the biasing force of spring 61a. This rotation will then remove extension 61 from tip 85a of trip rod 83 and allow biasing spring 86 to drive trip rod to the left and rotate tripper bar 80 counterclockwise for tripping the circuit breaker contacts.

Thus, upon operation of one of the current limiting fuses due to a potentially severe fault current such as fuse 40, the circuit breaker contacts will be disengaged to prevent single phasing and to disconnect the circuit.

Since the fuse operates to limit the let-through current to a substantially small fraction of the available short circuit current, the thermal and magnetic stresses applied to the breaker components is appreciably reduced.

Although I have here described preferred embodiments of my novel invention, many variations and modifications will now be apparent to those skilled in the art and I prefer therefore to be limited, not by the specific disclosure herein, but only by the appended claims.

I claim:

1. A selective trip system comprising a first circuit having one end thereof connected in series with one end of a plurality of second circuits; the current carrying capacity of said first circuit being substantially the sum of the current carrying capacities of said second circuits; said first circuit having a first circuit interrupter associated therewith; said first circuit interrupter being adapted to operate upon the occurrence of a short circuit current of a first magnitude; each of said second circuits having respective second circuit interrupters associated therewith; each of said second circuit interrupters comprising a combined circuit breaker and current limiting device; each of said circuit breakers including a thermal and a magnetic trip means; each of said current limiting devices being constructed to operate to open their respective circuit in response to potentially high short circuit currents in their respective circuits before said first circuit interrupter operates on said potentially high short circuit currents to thereby deenergize each of said second circuits; the magnitudes of said potentially high short circuit currents in said second circuits being less than said first magnitude; the other end of said first circuit being connected to a source of power; the other ends of said plurality of second circuits being corrected in series with respective loads to be energized from said source of power; the current limiting device of each of said first circuit interrupters being adapted, upon operation thereof, to effect complete circuit interruption of its associated first circuit independent of its associated series connected circuit breaker.

2. A selective trip system comprising a first circuit having one end thereof connected in series with one end of a plurality of second circuits; the current carrying capacity of said first circuit being substantially the sum of the current carrying capacities of said second circuits; said first circuit having a first circuit interrupter associated therewith; said first circuit interrupter being adapted to operate upon the occurrence of a short circuit current of a first magnitude; each of said second circuits having respective second circuit interrupters associated therewith; each of said second circuit interrupters comprising a combined circuit breaker and current limiting device; each of said circuit breakers including a thermal and a magnetic trip means; said circuit breaker portion of each of said second circuit interrupters comprising a trip unit including thermal and magnetic trip means for opening their respective circuit breakers in response to prolonged overload and relatively low short circuit conditions respectively before said first circuit interrupter operates; each of said current limiting devices being constructed to have a crossover point with respect to the trip unit of their respective circuit interrupter which is below the interrupting rating of their respective circuit breaker; each of said current limiting devices being constructed to operate to open their respective circuit in response to potentially high short circuit currents in their respective circuits before said first circuit interrupter operates on said potentially high short circuit currents to thereby deenergize each of said second circuits; the magnitudes of said potentially high short circuit currents in said second circuits being less than said first magnitude; the other end of said first circuit being connected to a source of power; the other ends of said plurality of second circuits being connected in series with respective loads to be energized from said source of power; the current limiting device of each of said first circuit interrupters being adapted, upon operation thereof, to effect complete circuit interruption of its associated first circuit independent of its associated series connected circuit breaker.

3. A selective trip system comprising a first circuit having one end thereof connected in series with one end of a plurality of second circuits; the current carrying capacity of said first circuit being substantially the sum of the current carrying capacities of said second circuits; said first circuit having a first circuit interrupter associated therewith; said first circuit interrupter being adapted to operate upon the occurrence of a short circuit current of a first magnitude; each of said second circuits having respective second circuit interrupters associated therewith; each of said second circuit interrupters comprising a combined circuit breaker and current limiting device; said circuit breaker portion of each of said second circuit interrupters comprising a trip unit including thermal and magnetic trip means for opening their respective circuit breakers in response to prolonged overload and relatively low short circuit conditions respectively before said first circuit interrupter operates; each of said current limiting devices being constructed to operate to open their respective circuit in response to potentially high short circuit currents in their respective circuits before said first circuit interrupter operates on said potentially high short circuit currents to thereby deenergize each of said second circuits; the magnitudes of said potentially high short circuit currents in said second circuits being less than said first magnitude; each of said respective current limiting devices limiting fault current to a value below the available short circuit current of their said respective second circuit to limit thermal and magnetic stress in both their respective second circuit and in said first circuit; the other end of said first circuit being connected to a source of power; the other ends of said plurality of second circuits being connected in series with respective loads to be energized from said source of power; the current limiting device of each of said first circuit interrupters being adapted, upon operation thereof, to effect complete circuit interruption of its associated first circuit independent of its associated series connected circuit breaker.

4. A selective trip system comprising a first circuit having one end thereof connected in series with one end of a plurality of second circuits; the other end of each of said plurality of second circuits being connected in series with one end of a plurality of third circuits; the current carrying capacity of said first circuit being substantially the sum of the current carrying capacities of said third circuits; each of said first circuit and said pluralities of second and third circuits having circuit interrupting means associated therewith; said first circuit interrupter being adapted to operate upon the occurrence of a short circuit current of a first magnitude; said interrupters in said second circuits being adapted to operate upon the occurrence of a short circuit current of a second magnitude smaller than said first magnitude; each of said third circuit interrupters comprising a combined circuit breaker and current limiting device; each of said circuit breakers including a thermal and a magnetic trip means; each of said current limiting devices being constructed to operate to open their respective circuit in response to potentially high short circuit currents in their respective circuits before their respective current interrupting means in said plurality of second circuits operates on said potentially high short circuit currents to deenergize each of its respective third circuits; the magnitudes of said potentially high short circuit currents in said third circuits being less than said second magnitude; the other end of said first circuit being connected to a source of power; the other ends of said plurality of third circuits being connected in series with respective loads to be energized from said source of power; the current limiting device of each of said first circuit interrupters being adapted, upon operation thereof, to effect complete circuit interruption of its associated first circuit independent of its associated series connected circuit breaker.

5. A selective trip system comprising a first circuit having one end thereof connected in series with one end of a plurality of second circuits; the other end of each of said plurality of second circuits being connected in series with one end of a plurality of third circuits; the current carrying capacity of said first circuit being substantially the sum of the current carrying capacities of said third circuits; each of said first circuit and said pluralities of second and third circuits having circuit interrupting means associated therewith; said first circuit interrupter being adapted to operate upon the occurrence of a short circuit current of a first magnitude; said interrupters in said second circuits being adapted to operate upon the occurrence of a short circuit current of a second magnitude smaller than said first magnitude; said interrupters in said third circuits being adapted to operate upon the occurrence of a short circuit current of a third magnitude smaller than said second magnitude; each of said second and third circuit interrupters comprising a combined circuit breaker and current limiting device; each of said circuit breakers including a thermal and a magnetic trip means; each of said current limiting devices of said third circuits being constructed to operate to open their respective circuit in response to potentially high short circuit currents in their respective circuits before their respective current interrupting means in said plurality of sound circuits operates on said potentially high short circuit currents to deenergize each of its respective third circuits; the magnitudes of said potentially high short circuit currents in said third circuits being less than said second magnitude; each of said current limiting devices of said second circuits being constructed to operate to open their respective circuits in response to potentially high short circuit currents in their respective circuits before said first circuit interrupter operates to deenergize each of said second circuits; the magnitudes of said potentially high short circuit currents in said second circuits being less than said first magnitude; the other end of said first circuit being connected to a source of power; the other end of said plurality of third circuits being connected in series with respective loads to be energized from said source of power; the current limiting device of each of said first circuit interrupters being adapted, upon operation thereof, to effect complete circuit interruption of its associated first circuit independent of its associated series connected circuit breaker.

6. A selective trip system comprising a first circuit having one end thereof connected in series with one end of a plurality of second circuits; the other end of each of said plurality of second circuits being connected in series with one end of a plurality of third circuits; the current carrying capacity of said first circuit being substantially the sum of the current carrying capacities of said third circuits; each of said first circuit and said pluralities of second and third circuits having circuit interrupting means associated therewith; said first circuit interrupter being adapted to operate upon the occurrence of a short circuit current of a first magnitude; said interrupters in said second circuits being adapted to operate upon the occurrence of a short circuit current of a second magnitude smaller than said first magnitude; said interrupters in said third circuits being adapted to operate upon the occurrence of a short circuit current of a third magnitude smaller than said second magnitude; each of said second and third circuit interrupters comprising a combined circuit breaker and current limiting device; each of said circuit breakers including a thermal and a magnetic trip means; each of said current limiting devices of said third circuits being constructed to operate to open their respective circuit in response to potentially high short circuit currents in their respective circuits before their respective current interrupting means in said plurality of second circuits operates on said potentially high short circuit currents to deenergize each of its respective third circuits; the magnitudes of said potentialy high short circuit currents in said third circuits being less than said second magnitude; each of said current limiting devices of said second circuits being constructed to operate to open their respective circuits in response to potentially high short circuit currents in their respective circuits before said first circuit interrupter operates to deenergize each of said second circuits; the magnitudes of said potentially high short circuit currents in said second circuits being less than said first magnitude; the thermal and magnetic stress in said first circuit being reduced by the current limiting action of said current limiting devices in said second and third circuits, the thermal and magnetic stress in said second circuits being reduced by current limiting action of said current limiting devices in said third circuits; the other end of said first circuit being connected to a source of power; the other ends of said plurality of third circuits being connected in series with respective loads to be energized from said source of power; the current limiting device of each of said first circuit interrupters being adapted, upon operation thereof, to effect complete circuit interruption of its associated first circuit independent of its associated series connected circuit breaker.

(References on following page)

References Cited in the file of this patent

UNITED STATES PATENTS

| | | |
|---|---|---|
| 1,479,465 | Greenwood | Jan. 1, 1924 |
| 1,919,466 | Jansson | July 25, 1933 |
| 2,140,360 | Jennings | Dec. 13, 1938 |
| 2,439,165 | Graves | Apr. 6, 1948 |
| 2,473,196 | Dannenburg | June 14, 1949 |
| 2,734,111 | Kozacka | Feb. 7, 1956 |
| 2,770,757 | Edsall | Nov. 13, 1956 |
| 2,823,338 | Edsall | Feb. 11, 1958 |
| 2,919,328 | Kozaca | Dec. 29, 1959 |
| 2,920,241 | Jacobs | Jan. 5, 1960 |